No. 7,950. PATENTED FEB. 25, 1851.
T. C. AVERY.
ELECTROMAGNETIC ENGINE.
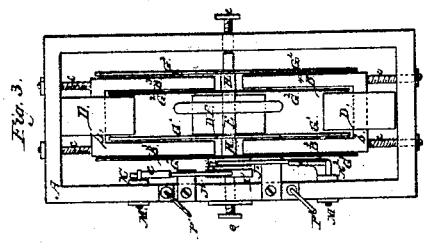
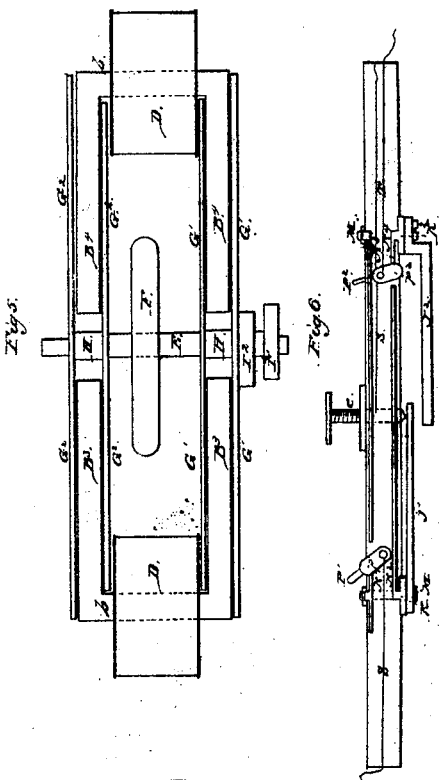
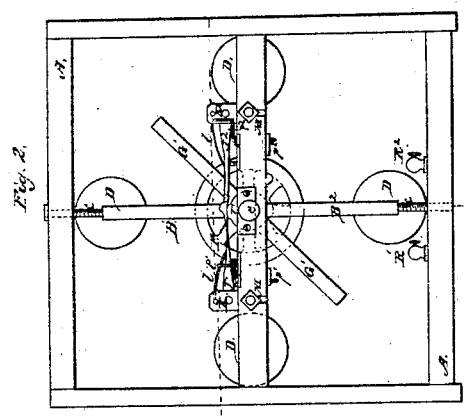
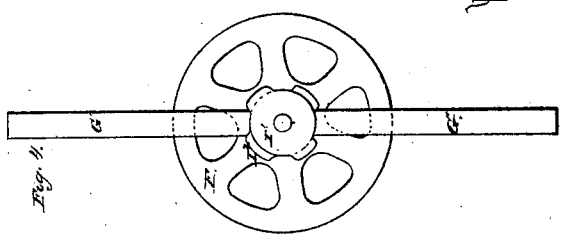
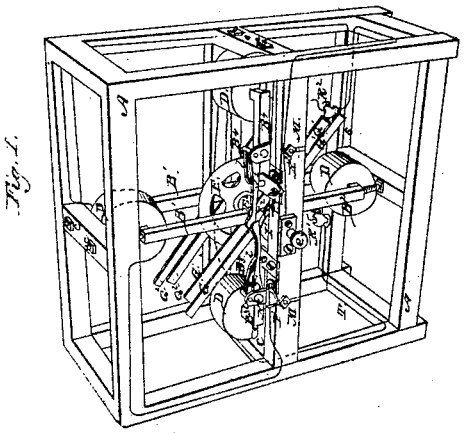

UNITED STATES PATENT OFFICE.

THOMAS C. AVERY, OF NEW YORK, N. Y.

IMPROVEMENT IN ELECTRO-MAGNETIC ENGINES.

Specification forming part of Letters Patent No. 7,950, dated February 25, 1851.

*To all whom it may concern:*

Be it known that I, THOMAS C. AVERY, of the city, county, and State of New York, have invented a new and improved mode of applying the forces of the electro-magnet for the purpose of producing a magnetic multiplying power-engine; and I do hereby declare the following to be a description of the same.

The nature of my invention consists in the combining in pairs four or more electro-magnets, so as to present their poles toward a common center, and having space enough intervening between the poles of the magnets for an axis. This axis is connected with one of the poles of the battery, so as to be a part of the galvanic circuit, and is supported at its two ends on the frame of the machine, so as to allow of revolving freely by the action of the magnets on the levers attached to the axis. At the points where the ends of the magnets approach the axis pieces of brass or other non-magnetic material is interposed to prevent the ends of the magnets acting upon the axis. On each side of these collars of brass, and of sufficient distance apart, are arranged on the axis arms or levers of the first order, between each two of which the ends or legs of the magnets are allowed to pass, and on which they exercise their attractive force alternately as the cams on the end of the revolving axis break and close the circuit through the opposite pairs of electro-magnets.

To describe my invention more particularly, I will refer to the accompanying drawings, the same letters of reference in the several drawings referring to the same parts wherever they occur.

Figure is a perspective view of the engine. Fig. 2 is a side elevation. Fig. 3 is a cut section through the dotted lines of Fig. 2. Fig. 4 is a side view of the axis and cams, &c. Fig. 5 is a horizontal view of the magnets and revolving lines. Fig. 6 is a view of the mode of reversing the galvanic currents.

Letter A is a frame, made of any suitable non-electric material, and having cross-bars for the purpose of supporting the magnets and revolving axis; $B'$ $B^2$ and $B^3$ $B^4$, two pairs (or four) of electro-magnets, two of which are vertical and two horizontal, having their poles converging toward a common center. These magnets are attached to the cross-bars of the frame by means of screw-bolts $c$ $c$ $c$, &c., and have round the bar $b$ $b$, &c., connecting the outer ends of the legs of the magnets, coils of insulated copper wire D D D D, wound in the usual manner for making electro-magnets—that is, $B'$ $B^2$ and $B^3$ $B^4$ are made to be in pairs of one circuit, and have opposite polarities for the purpose of exercising opposite attractive forces on the two ends of the axial magnetic levers.

Letter E is the revolving magnetic axis, supported on center pins or screws, $e$ $e$, (or by boxes, if required,) in the side rails of the engine, and having attached to it a fly-wheel, F, and two sets of arms or levers, $G'$ $G'$ and $G^2$ $G^2$. These levers or arms are attached at their middle to the revolving axis, and extend each way from it the length of the legs of the stationary magnets, forming thereby levers of the first order, the revolving axis-supports $e$ $e$ representing thin props. Each set of these levers—that is, $G'$ $G'$ and $G^2$ $G^2$—are attached to the axis, with space enough between them so as to barely allow room for the legs of the magnets to go between, for the purpose of keeping the revolving magnetic levers always within the influence of the magnets; letters H H, two brass collars secured on the axis between the levers $G'$ $G'$ and $G^2$ $G^2$, to prevent the magnetism at ends of the magnets acting on the axis.

Letters $I'$ and $I^2$ are two cams attached to the rotating axis, for the purpose of breaking and changing the direction of the magnetic current from the vertical to the horizontal magnets continuously as they revolve; letters $J'$ and $J^2$, two poles or circuit-closers acting at their outer or front ends on the cams by means of compressing-springs $l$ $l$, and attached at their back ends by a pin or screw to posts or support-pieces $K'$ and $K^2$, secured to the side cross-bar of the frame. These support-pieces are attached to the cross-bar by means of a screw, M, and in contact with or attached to pieces of brass $N'$ $N^2$ and $N^3$ $N^4$, or other conducting material secured on the under side of the cross-bar, (see Fig. 6,) for the purpose of reversing or changing the direction of the electric currents.

$P'$ and $P^2$ are two cranks, having center pins passing through the horizontal cross-bar, and attached to their lower ends buttons $p'$ and $p^2$, for the purpose of reversing the electric currents and the rotating of the engine; let ters R' and R², two binding-screws in the lower side cross-bar for making connection with the battery; letters S and T, red and blue ink-lines representing the mode of connecting the positive and negative poles of the battery with the magnets and the axis of the revolving magnetic levers.

The operation of the several parts are, that when in connection with the battery and the cranks (or the buttons $p'$ and $p^2$) are placed at right angles to the cross-bar, there will be no magnetic action through the engine; but on turning them to the left hand, so that the buttons $p'$ and $p^2$ are on N' and N⁴, respectively, a circuit will be established through the support-piece K', pawl or circuit closer or breaker J', cam I', axis E, and levers and the vertical magnets, causing thereby the axis and levers to revolve from right to left by the attractive forces of the vertical magnets and revolving magnetic levers till the levers get nearly parallel with the vertical magnets, when the cam I' breaks the circuit through the vertical magnets, and the cam I² closes it through the horizontal magnets, which continue to attract and increase the power of the leverage till the revolving magnetic levers are nearly on a line with them, when the cam I² breaks the circuit and the cam I' again establishes it through the vertical magnets, which commences again its attractive force at the heel of the revolving levers, and so continues its increasing or multiplying force at the opposite ends of the levers till nearly parallel, as before described, when it changes to the horizontal magnets again, and thus alternately continues its rotary motion. When reversing the rotary motion of the engine P' and P² must be turned to the right hand, so that the buttons $p'$ and $p^2$ are on N³ and N², respectively, when the direction of the currents of electricity is changed so as to pass through the support-pin K², pawl J², cam I², to the axes and levers and horizontal magnets, causing thereby a reversed rotatory motion from left to right and revolving continuously, as before described.

Having now described my invention, I will proceed to state what I claim as new and desire to secure by Letters Patent:

The use and manner of arranging the helices and poles of the electro-magnets, in combination with the revolving bars or sets of bars—that is to say, the helices being upon the bends of the magnets from which the poles of the magnets extend toward and near to the center of motion, and the revolving bars or armatures extending outward from the center of motion and embracing the poles of the magnets successively as it rotates, for producing a magnetic multiplying power-engine, substantially in parts and principle as herein set forth.

THOS. C. AVERY.

Witnesses:
JAMES S. BRADY,
CHARLES L. BARRITT.